US008665088B2

(12) United States Patent
Rajapakse et al.

(10) Patent No.: US 8,665,088 B2
(45) Date of Patent: Mar. 4, 2014

(54) METHOD AND APPARATUS INVOLVING GLOBAL POSITIONING AND LONG-RANGE WIRELESS LINK USING A TAG

(75) Inventors: Ravindra U. Rajapakse, San Francisco, CA (US); Liping Julia Zhu, San Jose, CA (US); David L. Shannon, State College, PA (US); Steven J. Farrell, Sunnyvale, CA (US)

(73) Assignee: Savi Technology, Inc., Alexandria, VA (US)

( * ) Notice: Subject to any disclaimer, the term of this patent is extended or adjusted under 35 U.S.C. 154(b) by 1165 days.

(21) Appl. No.: 11/270,387

(22) Filed: Nov. 9, 2005

(65) Prior Publication Data

US 2006/0109109 A1   May 25, 2006

Related U.S. Application Data

(60) Provisional application No. 60/629,479, filed on Nov. 19, 2004.

(51) Int. Cl.
*G08B 1/08* (2006.01)

(52) U.S. Cl.
USPC ............. 340/539.13; 340/539.1; 340/572.1; 340/991; 340/8.1; 455/404.2; 455/452.1; 455/457

(58) Field of Classification Search
USPC ......... 340/539.13, 572.1–572.9, 991, 825.49, 340/8.1; 235/382; 701/213, 207; 455/574, 455/572, 404.2, 414.2, 440, 452.1, 456.1, 455/457
See application file for complete search history.

(56) References Cited

U.S. PATENT DOCUMENTS

| | | | | |
|---|---|---|---|---|
| 5,133,081 | A | * | 7/1992 | Mayo ............................. 455/18 |
| 5,438,329 | A | * | 8/1995 | Gastouniotis et al. ... 340/870.02 |
| 7,180,403 | B2 | * | 2/2007 | Quan .......................... 340/10.3 |
| 7,333,001 | B2 | * | 2/2008 | Lane et al. .................. 340/10.1 |
| 7,340,015 | B1 | * | 3/2008 | Jones et al. ................... 375/347 |
| 2002/0138199 | A1 | * | 9/2002 | Brodie ......................... 701/213 |
| 2002/0177476 | A1 | * | 11/2002 | Chou ........................... 455/574 |
| 2004/0056091 | A1 | * | 3/2004 | Overhultz et al. ............ 235/382 |
| 2005/0052283 | A1 | * | 3/2005 | Collins et al. .............. 340/572.7 |
| 2005/0069051 | A1 | * | 3/2005 | Lourens ....................... 375/316 |
| 2005/0099269 | A1 | * | 5/2005 | Diorio et al. ............... 340/10.51 |
| 2005/0104745 | A1 | * | 5/2005 | Bachelder et al. ........... 340/906 |
| 2005/0174235 | A1 | * | 8/2005 | Davis et al. ............... 340/539.13 |
| 2005/0248456 | A1 | * | 11/2005 | Britton et al. ............ 340/539.29 |
| 2006/0097874 | A1 | * | 5/2006 | Salesky et al. ............. 340/572.1 |
| 2007/0141997 | A1 | * | 6/2007 | Wulff et al. .................... 455/78 |
| 2008/0197193 | A1 | * | 8/2008 | Overhultz et al. ............ 235/383 |

* cited by examiner

*Primary Examiner* — Hoi Lau
(74) *Attorney, Agent, or Firm* — IP Law Leaders PLLC; Cameron H. Tousi

(57) ABSTRACT

A tag has a transmitter for transmitting first wireless signals, and a receiver for receiving second wireless signals from which the tag can determine its current physical location. A different embodiment includes a tag having a transmitter for transmitting wireless signals, and a reader having a receiver for receiving the wireless signals, the receiver in the reader being an ultra-sensitive receiver.

24 Claims, 4 Drawing Sheets

METHOD AND APPARATUS INVOLVING GLOBAL POSITIONING AND LONG-RANGE WIRELESS LINK USING A TAG

This application claims the priority under 35 U.S.C. §119 of U.S. provisional application No. 60/629,479 filed Nov. 19, 2004, the disclosure of which is hereby incorporated herein by reference.

FIELD OF THE INVENTION

This invention relates in general to techniques for tracking items and, more particularly, to techniques for tracking items using radio frequency identification tags.

BACKGROUND

A known technique for tracking items is to mount a radio frequency identification (RFID) tag on each item to be tracked. These RFID tags transmit wireless signals, and readers are provided to receive these signals. The power levels of these wireless signals are limited by law. Consequently, in existing systems, the effective range of these wireless signals is typically only about 300 feet.

One practical example of a tracking application is that items of military equipment are often tracked using RFID tags. However, in a military theater of operations, many of the items to be tracked may be on the enemy's side of a battle line, where it is impractical to install and/or maintain an array of multiple readers that can reliably read RFID tags.

An example of a non-military application is a shipping port. In both military and non-military applications, it is typically necessary to provide an array of readers to cover a given area, and such an array contains a large number of readers. Given the number of readers, the cost of installing these types of systems is relatively high.

A further consideration that it is desirable to be able to reliably detect movement and/or transport of an item such as a shipping container. One known technique is to provide a motion sensor on the shipping container. However, a motion sensor cannot differentiate between movement of the item within a monitored area, and movement of the item out of the monitored area, for example due to theft.

Still another consideration is that RFID tags almost always run on battery power. Consequently, it is always desirable to conserve a tag's battery power, in order to maximize the length of time from insertion of a newly-charged battery until the battery becomes too discharged to properly operate the tag.

SUMMARY OF THE INVENTION

One of the broader forms of the invention relates to a tag having a transmitter and a receiver, and involves: transmitting first wireless signals through the transmitter; receiving second wireless signals through the receiver; and determining a current physical location of the tag as a function of the second wireless signals.

Another of the broader forms of the invention involves: transmitting wireless signals through a transmitter of a tag; and receiving the wireless signals through a receiver of a reader, the receiver being an ultra-sensitive receiver.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
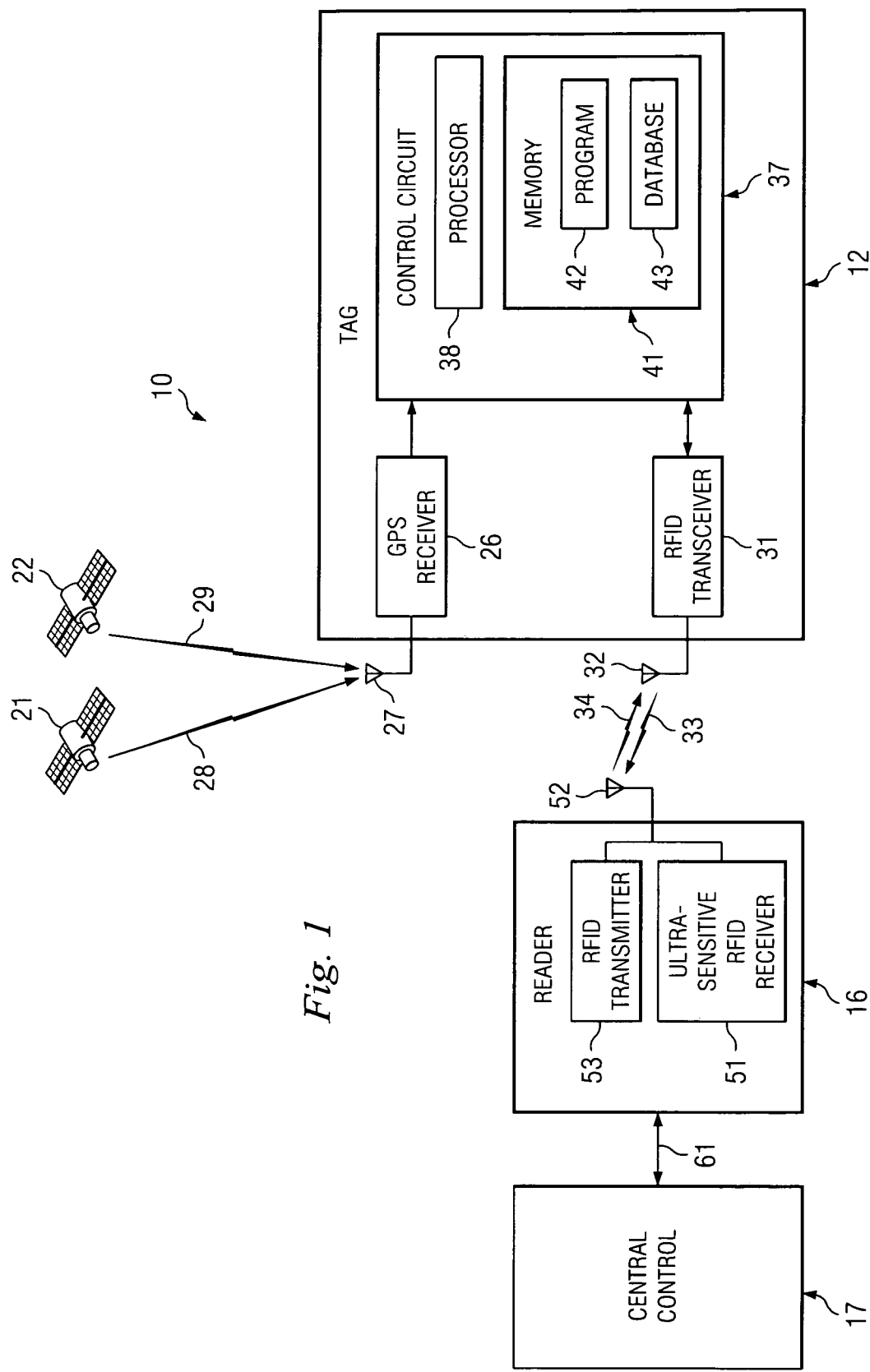
FIG. 1 is a block diagram of an apparatus that embodies aspects of the present invention, and that includes a radio frequency identification tag, a reader, global positioning system satellites, and a central control system.

FIG. 1 is a block diagram of an apparatus 10 that embodies aspects of the present invention. The apparatus 10 includes a radio frequency identification (RFID) tag 12, a reader 16, a central control system 17, and a plurality of global positioning system (GPS) satellites, two of which are shown at 21 and 22. FIG. 1 does not show all of the components of the apparatus 10, but only those needed to convey an understanding of the invention.

The tag 12 includes a GPS receiver 26, and an antenna 27 through which the GPS receiver 26 can receive GPS radio signals 28 and 29 that are broadcast by the GPS satellites 21 and 22. The tag 12 also includes an RFID transceiver 31, and an antenna 32 through which the RFID transceiver 31 can transmit RFID radio signals at 33, and receive RFID radio signals at 34.

The tag 12 further includes a control circuit 37. The control circuit 37 has a processor 38 of a known type, and a memory 41. The memory 41 is shown diagrammatically, and may include more than one different type of memory device. For example, the memory 41 may include read only memory (ROM), volatile random access memory (RAM), and non-volatile random access memory (flash memory). The memory 41 stores a program 42 that is executed by the processor 38. In addition, the memory 41 contains a database 43 that is discussed later. The electrical components within the tag 12 are all powered by a not-illustrated battery.

The reader 16 includes an RFID receiver 51, and an antenna 52 through which the RFID receiver 51 receives RFID signals, such as the signal 33. The reader 16 also includes a transmitter 53, and the transmitter 53 can use the antenna 52 to transmit RFID signals, such as the signal 34. The receiver 51 is an ultra-sensitive receiver that is capable of detecting extremely faint RFID radio signals. In this regard, the transceiver 31 and the transmitter 53 transmit RFID radio signals 33 and 34 that have approximately the same power level, because the power level is limited by government regulations. In the disclosed embodiment, the signals 33 and 34 each have a frequency of about 433 MHz, and a power level of about 1 mW EIRP (effective isotropic radiated power). Of course, aside from compliance with governmental regulations, a variety of other frequencies and power levels could alternatively be used. The transceiver 31 contains a standard RFID receiver of a known type, and persons skilled in the art will recognize that the radio signals 34 have an effective range of approximately 300 feet.

The signals 33 are transmitted with approximately the same power as the signals 34 but, as mentioned above, the receiver 51 is an ultra-sensitive receiver. In particular, the receiver 51 is sufficiently sensitive so that it can detect the radio signals 33 even when the signals 33 are extremely faint. In the disclosed embodiment, the receiver 51 achieves increased sensitivity by taking received signals 33 and applying digital signal processing (DSP) techniques of a type known in the art. However, it would alternatively be possible to use other techniques to achieve increased sensitivity in the receiver 51. Due to the increased sensitivity, the receiver 51 can receive the radio signals 33 even where the receiver 51 is as far as about 10 miles away from the transceiver 31, and where the tag 12 and reader 16 are not in a line-of-sight relationship with each other. Consequently, the RFID uplink and downlink ranges for the reader 16 and tag 12 are asymmetric, because the radio signals 34 have an effective range of approximately 300 feet, but the radio signals 33 have an effective range of approximately 10 miles. In other words, in the disclosed embodiment, the signals 33 have an effective range that is more than 175 times the effective range of the signals 34.

In an alternative embodiment, the RFID receiver within the transceiver 31 could be an ultra-sensitive receiver similar to the receiver 51. In that case, the uplink and downlink ranges would be approximately symmetric, because the signals 33 and 34 would each have an effective range of about 10 miles. However, providing an ultra-sensitive receiver within the transceiver 31 would increase the size, weight, cost and power consumption of the tag 12, and thus reduce the effective battery life. Accordingly, providing an ultra-sensitive receiver within the transceiver 31 is appropriate primarily in situations where there is a benefit that outweighs the increased size, weight, cost and power consumption.

Although the present discussion uses the term "reader" to refer to the unit 16, it should be understood that some other type of device could be used at 16 instead of a reader, if the device had the functionality that is described herein in association with the block 16, or otherwise provided that functionality at the appropriate location.

The central control system 17 is operably coupled to the reader 16 by a communications link 61. The communications link 61 may be any of a variety of different types of communications links. In particular, it may include one or more of a wireless link, a computer network, a telephone line, or some other form of link. The central control system 17 is a computer-based system of a type generally known in the art, and is therefore not illustrated and described in detail.

The operation of the apparatus 10 will now be briefly described. Typically, the reader 16 and the central control system 17 are stationary, and the tag 12 is mounted on some type of item that is to be tracked. For example, the tag 12 might be mounted on a vehicle, a shipping container, a shipping pallet, a specific product that is being shipped, or some other item.

Before the invention, in a facility such as a shipping port, there would typically be a plurality of readers arranged in a two-dimensional array. For example, a typical facility would have had an array of about 28 readers. The readers would be similar to the reader 16, except that the RFID receiver would not be an ultra-sensitive receiver. The spacing between adjacent readers in such an array was approximately 300 feet. This is due to the fact that the RFID signals transmitted and received by pre-existing readers each had an effective range of approximately 300 feet. Consequently, an inter-reader spacing of approximately 300 feet was needed, in order to ensure that signals transmitted by tags within the facility would each be received by at least two or three nearby readers. By identifying the specific readers received a particular signal, and the approximate strength of the signal at each such reader, it was possible to use triangulation techniques to determine the approximate location of the tag that transmitted the signal.

In contrast, in the disclosed embodiment, the reader 16 has the ultra-sensitive RFID receiver 51 that can receive signals 33 transmitted by tags 12 located up to about 10 miles away. Consequently, only a single reader 16 is needed for any given facility, such as a shipping port, because the reader can receive RFID signals transmitted by any tag within the facility. This obviously represents a significant reduction in the cost of the equipment needed for a given facility, because the traditional array of approximately 28 (or more) readers can be replaced with just a single reader. The reader 16 of the disclosed embodiment is also more advantageous for certain types of applications. For example, in a military theater of operations, it may be impractical or impossible to provide an array of pre-existing readers to track military assets, whereas the single reader 16 can track tagged assets over relatively long distances.

Another consideration is that, since the tag 12 of the disclosed embodiment has the GPS receiver 26, the tag 12 is normally capable of making a very accurate determination of its own current location on the surface of the earth, and this information can then be embedded in the signals 33 sent to the reader 16. Consequently, the central control system 17 does not need to use techniques such as triangulation to attempt to calculate an approximate position for a tag, but instead receives a much more accurate identification of each tag's exact location directly from the tag itself. Further, this is achieved using only the single reader 16, rather than multiple readers of a pre-existing type.

In order to conserve power and thus extend the effective life of its battery, the tag 12 has the capability to selectively enable and disable certain portions of its circuitry. In its lowest power mode, only a bare minimum portion of the circuitry within the tag 12 is powered and operating. As one aspect of this, with reference to the memory 41 of the tag 12, the database 43 includes a list of locations such as shipping ports or other facilities where one or more readers are known to be installed, including readers of the type shown at 16 in FIG. 1. Consequently, since the tag 12 has the GPS receiver 26 and thus knows its current physical location, the tag 12 can compare this current location to the information stored in the database 43, in order to determine whether the tag 12 is within range of a known reader, for example within 10 miles of a reader of the type shown at 16, or within 300 feet of a pre-existing reader.

If the tag is outside the range of any known reader, the tag 12 can keep the transmitter portion of its transceiver 31 disabled, in order to conserve power. Alternatively, the tag 12 can enable the transmitter portion of its transceiver 31 on an infrequent basis, so that the transmitter portion can occasionally transmit a tag signal 33, in case the tag 12 happens to come within range of a reader that does not happen to be listed in the database 43. On the other hand, if the tag 12 determines from the GPS information and database 43 that it is within range of a known reader, then the tag 12 can enable the transmitter portion of the transceiver 31 more frequently, or keep the transmitter portion enabled continuously.

As to the GPS receiver 26, the tag 12 normally keeps the GPS receiver 26 enabled at all times. Alternatively, however, the tag 12 could enable and disable the GPS receiver 26 on a selective basis. For example, when the tag 12 determines from GPS information that the tag is within range of a known reader, the tag 12 can keep the GPS receiver 26 continuously enabled. Conversely, when the tag 12 knows that it is well outside the range of any known reader, the tag 12 can keep the GPS receiver 26 disabled most of the time to conserve power, and can enable the GPS receiver only infrequently. Each time the GPS receiver is enabled on an infrequent basis, the tag 12 can collect fresh GPS information and then re-determine its current location, in order to see whether it has been moved to a location that is relatively close to a known reader. If so, the tag 12 can keep the receiver 26 enabled. Otherwise, the tag 12 can continue to keep the GPS receiver disabled most of the time, and enable it only infrequently.

It should be noted that, due to the presence of GPS capability within the tag 12, the selective enabling and disabling of the transmitter portion of the RFID transceiver 31, and/or the GPS receiver 26, can be carried out as a function of the physical location of the tag 12. In contrast, in pre-existing tags, the selective enabling and disabling of transmitters or receivers involved a schedule that was not a direct function of the location of the tag. Thus, for example, in the case of the tag 12, the time interval between successive enabling operations can be longer when the tag is a very long distance from any known reader (to conserve power), and can become progressively shorter as the tag gets progressively closer to a known reader.

Assume for the sake of example that the tag 12 is mounted on a shipping container, and that the shipping container is delivered by truck or railroad to an ocean shipping port, where it then sits for two or three days while waiting to be loaded onto a ship for transport to a different port. Alternatively, the container might arrive at the port by ship and be unloaded, and then wait two or three days within the port before being loaded onto a truck for highway transport to a destination. In either case, while waiting, the container may be moved one or more times within the port itself. Some pre-existing tags were associated with motion sensors. But even though a motion sensor can detect movement that occurs after a container has arrived at a port, a motion sensor cannot differentiate movement of the container within the port from movement onto a ship or truck for transport out of the port.

In contrast, in the disclosed embodiment, the tag 12 has the GPS receiver 26, and forwards GPS location information to the reader 16, which in turn forwards it at 61 to the central control system 17. The central control system 17 thus knows whether the location of the tag 12 represents a position within the shipping port, or a position out over the water (for example in the hold of a ship). If the tag 12 is supposed to be waiting in the shipping port but reports that it is now at some other location, either over land or over water, it may mean that the container has been stolen or misrouted. In that case, the central control system 17 can raise an appropriate alarm to make a person aware of the problem, and then the person can take appropriate action.

The foregoing discussion assumes that the signals 33 transmitted by the tag 12 are all tag signals that are voluntarily transmitted by the tag 12, without any external trigger. However, the tag 12 also has an operational mode in which the reader 16 (or a not-illustrated signpost of a known type) can transmit at 34 an RFID interrogation signal. If the interrogation signal arrives when the tag 12 has the transmitter portion of the transceiver 31 disabled (to conserve power), then the tag 12 enables the transmitter portion of the transceiver 31 in response to receipt of the interrogation signal. In either case, the tag 12 then responds to the interrogation signal, for example by transmitting a tag signal 33. It should also be understood that, although the disclosed embodiment illustrates one application of the invention using a tag 12 that is an active tag, the invention can also be applied to a system having one or more passive tags.

Figure 2:
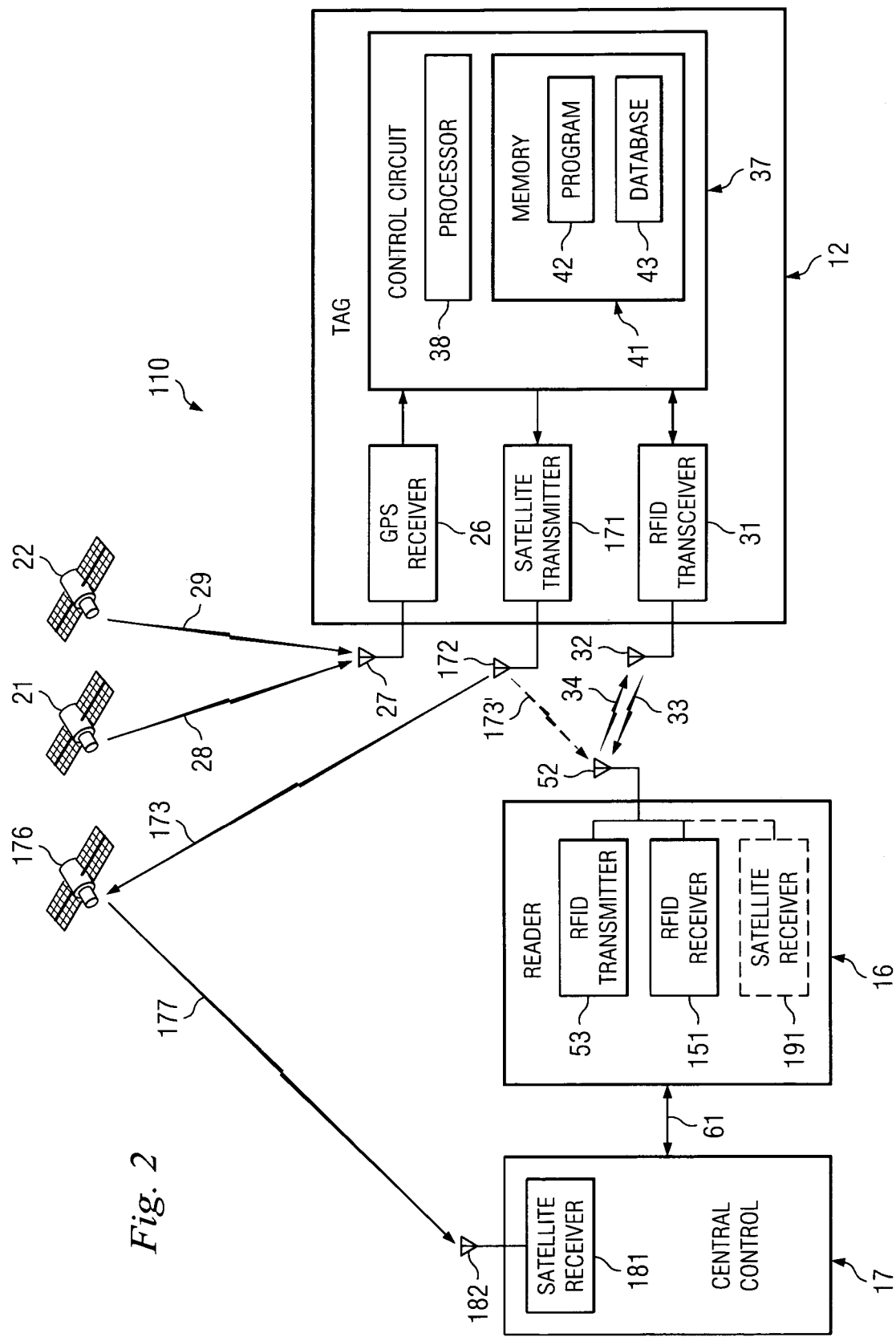
FIG. 2 is a block diagram of an apparatus that is an alternative embodiment of the apparatus of FIG. 1, and that embodies aspects of the present invention.

FIG. 2 is a block diagram of an apparatus 110 that is an alternative embodiment of the apparatus 10 of FIG. 1, and that embodies aspects of the present invention. The apparatus 110 of FIG. 2 is generally identical to the apparatus 10 of FIG. 1, except for differences that are described below. In this regard, the apparatus 110 of FIG. 2 includes all of the same components as the apparatus 10 of FIG. 1. Within these components, the only significant difference is that the ultra-sensitive RFID receiver 51 of FIG. 1 has been replaced with a standard RFID receiver 151, which is not ultra-sensitive. Consequently, the transmitted RFID signals 33 and 34 each have an effective range of approximately 300 feet. In addition to the components that correspond to the components of FIG. 1, the embodiment of FIG. 2 also has some additional components.

More specifically, the tag 12 includes a satellite transmitter 171, and an antenna 172 through which the satellite transmitter 171 can transmit a signal 173 to a satellite 176. The signal 173 may be a signal of the type commonly used in association with portable pagers, or could be some other type of satellite signal. The satellite 176 then re-transmits the information from the signal 173, in the form of a further signal 177. The central control system 17 includes a satellite receiver 181, and an antenna 182 through which the receiver 181 can receive the signal 177.

As discussed above, the embodiment of FIG. 1 has an uplink signal 33 with a significantly longer effective range than the downlink signal 34. In contrast, in the apparatus 110 of FIG. 2, it is the uplink signals 173 and 177 that have a significantly longer effective range than the downlink signal 34. With this in mind, it can be said that the internal operation of the tag 12 of FIG. 2 is generally the same as the internal operation of the tag 12 of FIG. 1, except that most or all of the information that was transmitted through the long-range link 33 in the embodiment of FIG. 1 is instead transmitted through the long-range link 173 and 177 in the embodiment of FIG. 2. An exception is that, when the tag 12 determines from GPS information and database 43 that it is within approximately 300 feet of a reader 16, the tag 12 can disable the transmitter 177, and use the transceiver 31 to transmit at 33 the information that would otherwise be transmitted through the long-range link 173 and 177.

In other respects, the operation of the embodiment of FIG. 2 is generally identical to the operation of the embodiment of FIG. 1. Therefore, to avoid unnecessary redundancy, aspects of the operation of the embodiment of FIG. 2 that are the same as in the embodiment of FIG. 1 are not described again here in detail.

In FIG. 2, the reader 16 can optionally be provided with a satellite receiver 191 that is capable of receiving a satellite signal 173' through the antenna 52, where the satellite signal 173' is the same as the satellite signal 173. Consequently, when the satellite receiver 191 is present, the information transmitted by the satellite transmitter 171 in the tag 12 can be directly received at 173' by the reader 16, without being routed through the satellite 176. In that case, the radio link 173' can serve as a long-range link that corresponds to the long-range link 33 in the embodiment of FIG. 1.

In the embodiments shown in FIGS. 1 and 2, the information embedded in the RFID signals 33 and 34 could optionally be encrypted for added security, using known encryption techniques. Similarly, in the embodiment of FIG. 2, the satellite-related transmissions at 173, 173' and 177 could optionally be encrypted for added security.

As mentioned above, in a military theater of operations, it may be impractical or impossible to provide an array of pre-existing readers for the purpose of tracking military assets. In this regard, in a dynamic battlefield supply chain scenario, pre-existing RFID readers sometimes have to be installed in areas that may still be hostile or dangerous. While some mobile reader deployment options are available, there can still be considerable risk to a soldier who is in a hostile area and who is trying to set up a suitable infrastructure, such as an array of the pre-existing RFID readers. In contrast, the disclosed long-range reader 16 would reduce or eliminate that risk, because the reader 16 can be installed well behind a front line, and still track assets that are disposed on the other side of the front line. In this regard, FIG. 3 is a block diagram representing a top view of a battlefield, where two readers 16 are installed behind a front line 201, and where a plurality of tags such as 206 and 207 are mounted on respective assets disposed on the other side of the front line 201, so that the assets can be tracked by the readers 16.

Figure 3:
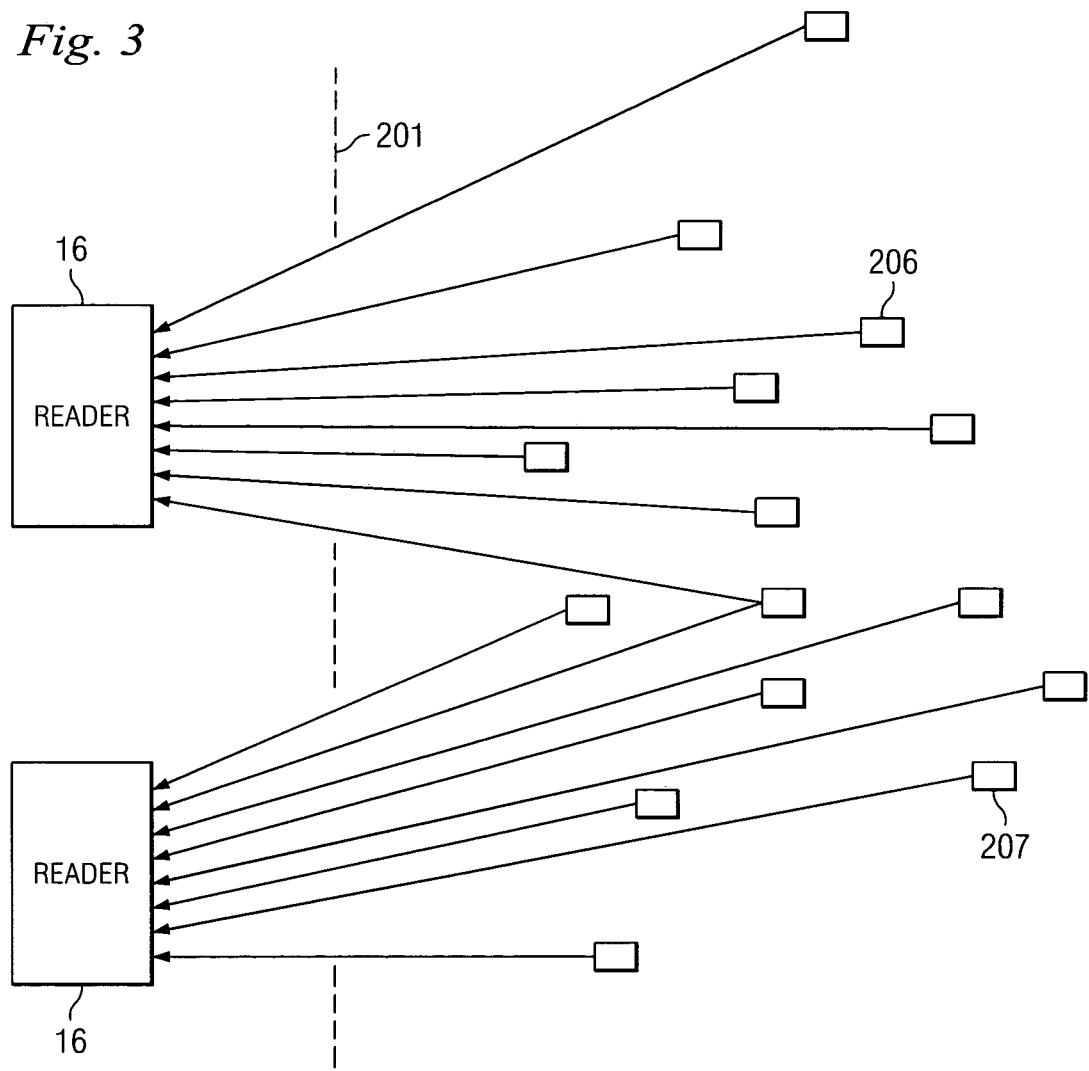
FIG. 3 is a block diagram representing a top view of a battlefield, where two readers are installed behind a front line and a plurality of tags are mounted on assets disposed on the other side of the front line, so that the assets can be tracked by the readers.

In FIG. 3, the readers 16 are each stationary units mounted at selected locations. However, one or more of these long-range readers 16 could optionally be mounted on a surveillance aircraft, in order to provide battlefield coverage either before stationary long range readers can be installed, or after installation of stationary readers in order to augment the coverage provided by those stationary readers.

Use of two or more of the long range readers 16, as shown in FIG. 3, can help to reduce or eliminate missed reception of signals transmitted by tags, for example due to obstructions or intervening objects such as land masses, foliage, buildings, and so forth. To the extent that any transmitted signal is received by two or more readers 16, software in a central computer (such as that at 17 in FIG. 1) can compare the information received from each reader to the information received from other readers, and then filter out duplicate reads of the same signal.

Although FIGS. 1 and 2 each show a reader 16 having a single antenna 52, it would alternatively be possible for the reader 16 to have multiple antennas, in order to provide "diversity" that improves non-line-of-sight signal reception. This would further help to reduce or eliminate missed reception of signals transmitted by tags, for example due to obstructions or intervening objects such as land masses, foliage, buildings, and so forth.

Figure 4:
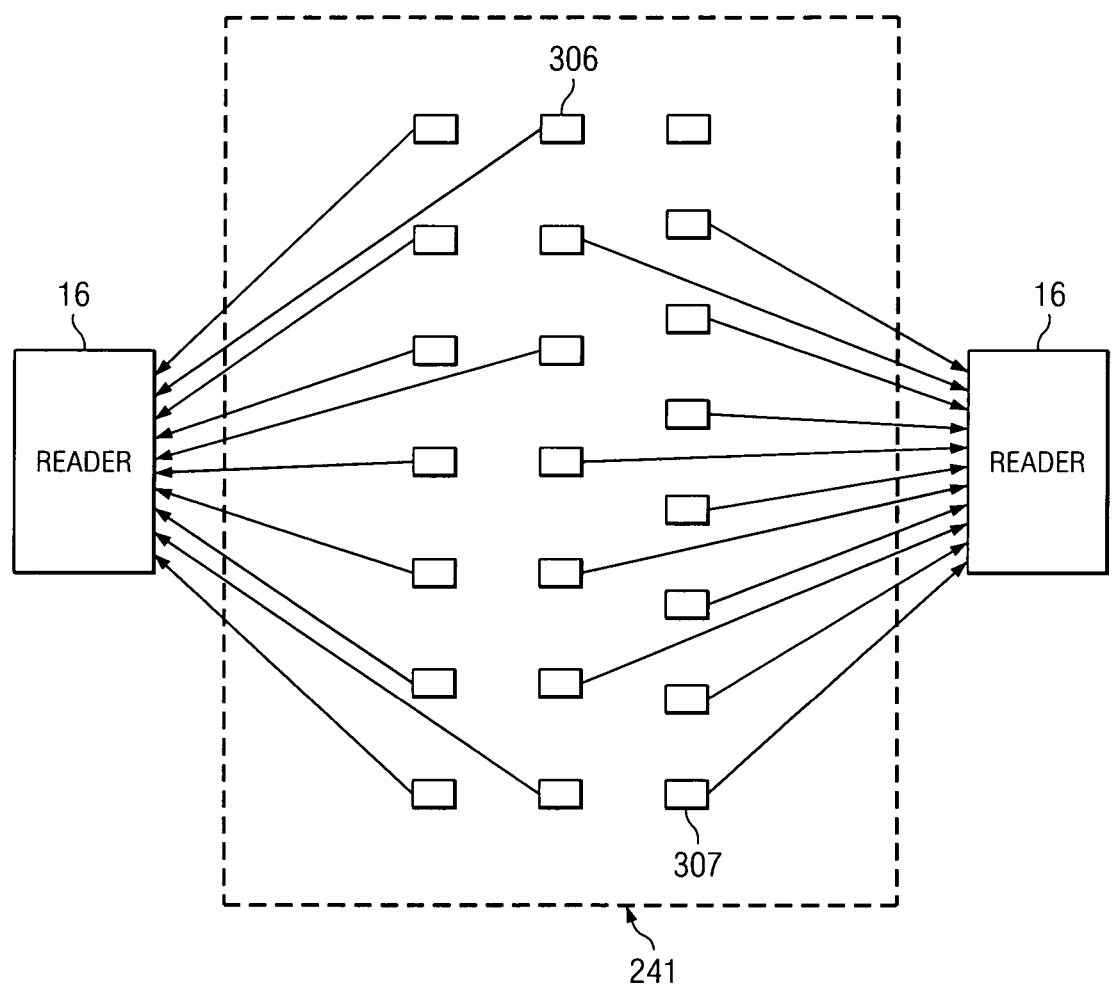
FIG. 4 is a block diagram representing a top view of a shipping port that has two long range readers installed at spaced locations, in order to read tags located within the port.

In this regard, and as discussed earlier, monitoring of assets located in a large open outdoor area requires that a large number of RFID readers be installed throughout that area, which may for example be a yard for vehicles or a port for ships. Where two or more of the pre-existing readers receive a signal from a tag, the location of the tag and its associated asset can be inferred using various techniques, examples of which include attenuation levels, signal time of arrival at respective readers, and a technique known in the art as RSSI. In contrast, installing one or two of the long range readers 16 greatly reduces the total number of readers, by eliminating the need for dozens of the pre-existing RFID readers. For example, FIG. 4 is a block diagram representing a top view of a shipping port 241 that has two of the long range readers 16 installed at spaced locations, in order to read tags such as 306 and 307 located within the port.

A further consideration is that by using tags such as the tag 26 (which has a built-in GPS receiver), each tag has the built-in capability to precisely determine and then report its own location, thereby avoiding the need to use RSSI and other techniques.

Although selected embodiments have been illustrated and described in detail, it should be understood that a variety of substitutions and alterations are possible without departing from the spirit and scope of the present invention, as defined by the following claims.

What is claimed is:

1. An apparatus comprising a tag comprising:
   a transmitter for transmitting first wireless signals; and
   a receiver for receiving second wireless signals from which said tag can determine its current physical location;
   wherein said tag includes a memory that stores a database containing information for identifying a plurality of known readers, that can each receive said first wireless signals, and for identifying the physical location of each of the known readers.

2. An apparatus according to claim 1, wherein said receiver is a Global Positioning System (GPS) receiver; and wherein said second wireless signals are GPS signals.

3. An apparatus according to claim 1,
   wherein said tag configures said first wireless signals to include information representing the current physical location of said tag as determined from said second wireless signals.

4. An apparatus according to claim 1, wherein said transmitter is one of a radio frequency identification (RFID) transmitter, a pager transmitter, and a satellite transmitter.

5. An apparatus according to claim 1, wherein said tag includes circuitry that selectively controls power to at least one of said transmitter and said receiver as a function of said information in said database and as a function of the current physical location of said tag as determined from said second wireless signals.

6. An apparatus according to claim 5,
   wherein said circuitry has an operational mode in which it disables power to said transmitter; and
   wherein said circuitry utilizes said operational mode when the known readers are outside the range of said first wireless signals.

7. An apparatus according to claim 6,
   wherein when said circuitry is operating in said operational mode said circuitry periodically interrupts operation in said operational mode long enough to send some of said first wireless signals through said transmitter.

8. An apparatus according to claim 6,
   wherein said tag includes a further receiver; and
   wherein when said circuitry is operating in said operational mode said circuitry is responsive to an interrogation signal received through said further receiver for interrupting operation in said operational mode long enough to send some of said first wireless signals.

9. An apparatus according to claim 5,
   wherein said circuitry has an operational mode in which it disables power to said receiver; and
   wherein said circuitry utilizes said operational mode when the known readers are outside the range of said first wireless signals.

10. An apparatus according to claim 9, wherein when said circuitry is operating in said operational mode said circuitry periodically interrupts operation in said operational mode long enough to receive some of said second wireless signals through said receiver and determine the current physical location of said tag.

11. An apparatus according to claim 10,
    wherein said circuitry effects said periodic interruptions at points in time spaced by a selected time interval; and
    wherein said circuitry varies said selected time interval as a function of a distance from said tag to the nearest one of the known readers.

12. An apparatus according to claim 9,
    wherein said tag includes a further receiver; and
    wherein when said circuitry is operating in said operational mode said circuitry is responsive to an interrogation signal received through said further receiver for interrupting operation in said operational mode long enough to receive some of said second wireless signals and determine the current physical location of said tag.

13. An apparatus according to claim 1, wherein said tag includes:
   a further transmitter, said transmitters having respective ranges that are different; and
   circuitry that selectively controls power to each of said transmitters as a function of said information in said database and as a function of the current physical location of said tag as determined from said second wireless signals.

14. A method for operating a tag having a transmitter and a receiver, comprising:
   transmitting first wireless signals through said transmitter;
   receiving second wireless signals through said receiver;
   determining a current physical location of said tag as a function of said second wireless signals; and
   storing within said tag a database containing information identifying a plurality of known readers that can each receive said first wireless signals, and identifying the physical location of each of the known readers.

15. A method according to claim 14, including:
   selecting said receiver to be a Global Positioning System (GPS) receiver; and carrying out said receiving of said second wireless signals in a manner that includes receiving GPS signals.

16. A method according to claim 14, including configuring said first wireless signals to include information representing the current physical location of said tag as determined from said second wireless signals.

17. A method according to claim 14, including selectively controlling power to at least one of said transmitter and said receiver as a function of said information in said database and as a function of the current physical location of said tag as determined from said second wireless signals.

18. A method according to claim 17,
   wherein said tag has an operational mode in which it disables power to said transmitter; and
   including utilizing said operational mode when the known readers are outside the range of said first wireless signals.

19. A method according to claim 18, including periodically interrupting operation in said operational mode long enough to send some of said first wireless signals through said transmitter.

20. A method according to claim 18, including responding to an interrogation signal received through a further receiver of said tag by interrupting operation in said operational mode long enough to send some of said first wireless signals.

21. A method according to claim 17,
   wherein said tag has an operational mode in which it disables power to said receiver; and
   including utilizing said operational mode when the known readers are outside the range of said first wireless signals.

22. A method according to claim 21, including periodically interrupting operation in said operational mode long enough to receive some of said second wireless signals through said receiver and determine the current physical location of said tag.

23. A method according to claim 22, including:
   effecting said periodic interruptions at points in time spaced by a selected time interval; and
   varying said selected time interval as a function of a distance from said tag to the nearest one of the known readers.

24. A method according to claim 21, including responding to an interrogation signal received through a further receiver of said tag by interrupting operation in said operational mode long enough to receive some of said second wireless signals through said receiver and determine the current physical location of said tag.

* * * * *